(12) United States Patent
Videen et al.

(10) Patent No.: US 9,116,838 B2
(45) Date of Patent: Aug. 25, 2015

(54) DETERMINING LYAPUNOV EXPONENTS OF A CHAOTIC SYSTEM

(75) Inventors: Gorden Videen, Silver Spring, MD (US); Robert H Dalling, Natchitoches, LA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 1110 days.

(21) Appl. No.: 13/082,764

(22) Filed: Apr. 8, 2011

(65) Prior Publication Data

US 2012/0259902 A1    Oct. 11, 2012

(51) Int. Cl.
| | |
|---|---|
| *G06F 7/60* | (2006.01) |
| *G06F 17/10* | (2006.01) |
| *G06F 15/18* | (2006.01) |
| *G06F 17/13* | (2006.01) |
| *G06N 7/08* | (2006.01) |

(52) U.S. Cl.
CPC . *G06F 17/13* (2013.01); *G06N 7/08* (2013.01)

(58) Field of Classification Search
CPC .................................. G06F 17/13; G06N 7/08
USPC .................................................. 703/2; 706/52
See application file for complete search history.

(56) References Cited

U.S. PATENT DOCUMENTS

| | | | | |
|---|---|---|---|---|
| 5,379,346 A | * | 1/1995 | Pecora et al. | 380/263 |
| 5,465,219 A | * | 11/1995 | Jeffers | 700/274 |
| 6,954,700 B2 | * | 10/2005 | Higashida et al. | 702/19 |
| 7,321,842 B2 | * | 1/2008 | Shiomi et al. | 702/181 |
| 7,737,859 B2 | * | 6/2010 | Takaoka et al. | 340/575 |
| 8,768,874 B2 | | 7/2014 | Videen | |
| 2012/0259808 A1 | * | 10/2012 | Videen et al. | 706/52 |

OTHER PUBLICATIONS

Ziehmann, Christine, Leonard A. Smith, and Jürgen Kurths. "Localized Lyapunov exponents and the prediction of predictability." Physics Letters A 271.4 (2000): 237-251.*
Kinsner, Witold. "Characterizing chaos through Lyapunov metrics." Systems, Man, and Cybernetics, Part C: Applications and Reviews, IEEE Transactions on 36.2 (2006): 141-151.*
A.M. Liapunov, Ann. Math. Studies 17, 1947 (1907).
H.G. Schuster, Deterministic Chaos, an Introduction, Second Revised Edition, (VCH, Weinheim Germany, 1988), p. 116.
G. Benettin, L. Galgani, and J.M. Strelcyn, Phys. Rev. A14, 2338 (1976).
A. Wolf, J.B. Swift, H.L. Swinney, and J.A. Vastano, Physica 16D, 285 (1985).
J. Froyland, and H. Alfsen, Phys. Rev. A29, 2928 (1984).
E.N. Lorenz, Physica D 35, 299 (1989).

(Continued)

*Primary Examiner* — Aniss Chad
(74) *Attorney, Agent, or Firm* — Christos S. Kyriakou

(57) ABSTRACT

Systems and methods for calculating the Lyapunov exponent of a chaotic system are described. In one particular embodiment, a Lyapunov exponent calculating method includes obtaining a value indicative of a condition of a chaotic system and assigning the value to first and second precision levels, the second precision level having a higher level of precision than the first precision level. The method also includes iterating the chaotic system over time and comparing the value at the first precision level with the value at the second precision level. From the comparison of values at the first and second precision levels, the method calculates the Lyapunov exponent for the chaotic system.

17 Claims, 11 Drawing Sheets

(56) References Cited

OTHER PUBLICATIONS

E.N. Lorenz, Noisy periodicity and reverse bifurcation Nonlinear Dynamics, edited by R.H.G. Helleman. (New York Academy of Sciences: New York, 1980).

P.M. Gade, and R.E. Amritkar Phys. Rev. Lett. 65, 389 (1990).

P.M. Gade, and R.E. Amritkar Phys. Rev. A 45, 725 (1992).

E.N. Lorenz, J. Atmos. Sci. 20, 130 (1963).

R.Z. Sagdeev, D.A. Usikov, G.M. Zaslavsky, Nonlinear Physics, From the Pendulum to Turbulence and Chaos, (Harwood Academic Publishers, Chur, 1988), p. 166.

Palmer, T.N., "Predicting uncertainty in forecasts of weather and climate", Nov. 1999.

* cited by examiner

DETERMINING LYAPUNOV EXPONENTS OF A CHAOTIC SYSTEM

GOVERNMENT INTEREST

The invention described herein may be manufactured, used, and licensed by or for the United States Government.

RELATED APPLICATIONS

The present application is related to U.S. application Ser. No. 13/082,824 titled "PREDICTING THE OUTCOME OF A CHAOTIC SYSTEM USING LYAPONOV EXPONENTS" and filed on Apr. 8, 2011, now U.S. Pat. No. 8,768,874.

BACKGROUND OF THE INVENTION

1. Technical Field of the Invention

The invention relates to determining the maximal Lyapunov exponent in a chaotic system. More particularly, the invention relates to determining the maximal Lyapunov exponent by comparing values calculated at different precision levels.

2. Description of the Related Art

Chaotic, non-linear systems are known. Examples of chaotic systems include, but are not limited to, the weather, the stock market and fluid flow. By its nature it is difficult to calculate the outcome of a chaotic system. A slight change in initial conditions or an intervening event can result in a completely different system trajectory and a completely different outcome. In a weather system, a slight change in the initial conditions of temperatures and pressures at several locations produces a different weather trajectory. As a result, a long range forecast may be difficult or impossible to make. One method of predicting an outcome of a chaotic system is by calculating a Lyapunov exponent. The Lyapunov exponent is a measure of the exponential rate of divergence of a system trajectory with respect to time.

It is well known that the significant digits of variables defining a chaotic system are rapidly lost during calculation and the initially valid digits in the chaotic system become meaningless in a small number of iterations. The number of valid digits n(t) decreases linearly with time. The maximal Lyapunov exponent L is equal to $-dn/dt$ and can be calculated to determine the number of digits lost per unit time. Traditional Lyapunov exponent algorithms, such as those calculated by the Benettin technique, can be applied only to a system of differential equations. A different algorithm is used for discrete maps and no algorithm existed here-to-fore for any other mathematical methods.

SUMMARY OF THE INVENTION

The present invention provides a method of calculating the Lyapunov exponent of a series of time-dependent differential equations describing a chaotic system. A variable is selected from the equations that are indicative of a condition in the chaotic system. A value for the variable is selected at an initial time. A first precision level and a second precision level are assigned for the calculation. The second precision level is a higher level of precision than the first precision level. Starting at the initial value for the variable and at the initial time, two calculations are carried out. In the first calculation the series of differential equations is iterated with respect to time at the first precision level to produce a value for the variable. In the second calculation, the differential equations are iterated with respect to time at the second, higher precision level to produce another value for the variable. The two values of the variable are compared and the Lyapunov exponent calculated therefrom.

The method may be used to make predictions in chaotic physical systems described by time-dependent differential equations. The method is particularly useful in weather forecasting.

BRIEF DESCRIPTION OF THE DRAWINGS

Many aspects of the disclosure can be better understood with reference to the following drawings.

DETAILED DESCRIPTION OF THE PREFERRED EMBODIMENTS

Figure 1:
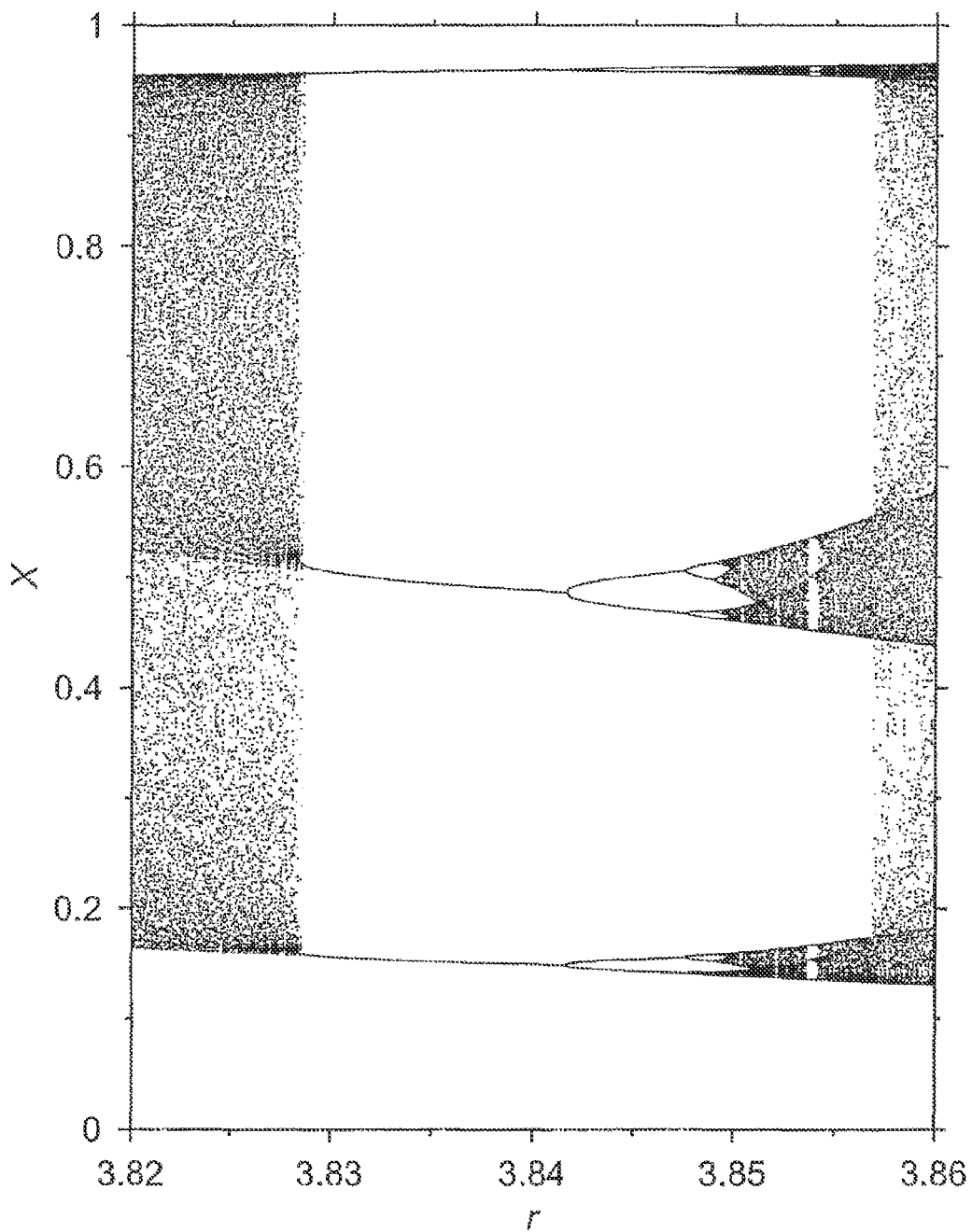
FIG. 1 is a graph of a period-3 window of a logistic map.

The invention provides a method for determining the maximal Lyapunov exponent of a chaotic system. The chaotic system is described by a system of time-dependent differential equations. Suggested differential equations a include, but are not limited to, weather systems, fluid flow systems, traffic patterns, stock market patterns and other systems that are sensitive to one or more conditions. The inventive method may be applied to any chaotic system described by a system of time-dependent differential equations. The method is distinguished in an accurate determination of the maximal Lyapunov exponent of a chaotic system with less computational complexity than previously known methods. With regard to weather systems, also referred to as weather maps, the method can be used to accurately and quickly determine the maximal Lyapunov exponent of weather patterns in a location. With regard to fluid flow systems, the method can be used to determine the maximal Lyapunov exponent for water flow through a conduit or around a structure, such as a dam, spillway or watercraft. Fluid flow systems may also include air flow systems such as those which may be used to design an airplane or other aircraft. With regard to traffic systems, the method can be used to determine the maximal Lyapunov exponent for patterns of vehicle traffic in a road network.

The method is used to accurately determine the maximal Lyapunov exponent of a chaotic system, described by a system of time-dependent differential equations. The method compares single-precision calculations with double-precision calculations to determine the maximal Lyapunov exponent. The resulting maximal Lyapunov exponent is found in less than one-tenth of the computational time required by traditional methods. The algorithm of the method can be applied to maps, such as weather forecast maps, and systems of differential equations. This algorithm is easily coded because it is free of Jacobians, tangent vectors, Gramm-Schmidt procedures, overflow errors, and trial-and-error parameters. Furthermore, this algorithm is applicable to any numerical time-evolution procedure and can be applied where no existing routine is available, such as in recursion relations or to the successive terms of a series, as often exist in quantum mechanical calculations. It has been found that the maximum Lyapunov exponent can be experimentally measured by comparing two data runs of the chaotic system at different levels of precision.

A new technique involving the products of the ratios of successive differentials is used to find maximal Lyapunov exponents in systems of differential equations. Lyapunov exponent plots and local Lyapunov exponent distributions are given for the logistic map and the Lorenz equations. Restricted error regions are discussed where the Lyapunov exponent is greater than zero, but the error magnitude is restricted to a fraction of the size of the available phase space. An empirical formula is also provided which can quickly calculate the r∞ point of a period p window.

The time rate of loss of the number of valid digits, dn/dt, can be determined by comparing single-precision and double-precision calculations of the system trajectory and used to determine to produce maximal Lyapunov exponents. The method described herein can be applied, without alteration, to maps, such as weather maps, and systems of differential equations. It can be applied to any time evolution system, such as recursion relations and the Gramm-Schmidt re-orthogonalization procedure. It has been used to determine Lyapunov exponents in the chaotic behavior found in a first number of partial sums, such as the first 50 partial sums, of a series describing the electromagnetic scattering from a pair of overlapping spheres. This lost digits technique, which is the invention described herein, can be used to test for divergence between two calculations of differing precision, which describe the time evolution in quantum mechanical systems.

The invention is also a computer method that uses the source code of the nonlinear system as a subroutine to perform calculations. The input to the computer method includes initial conditions and the relative uncertainties of these conditions. In a weather forecasting program, the input includes the temperature and pressure at various geographic locations and uncertainties associated with these input values. The main program calculates trajectories and Lyapunov exponents of these trajectories. It then determines the smallest exponent and assigns this as the most likely outcome.

The method of the invention for calculating Lyapunov exponents using single precision and double precision values for determining the maximal Lyapunov exponent of chaotic systems can be implemented in software, hardware, or a combination thereof. In the currently contemplated Best Mode for carrying out the invention, the system is implemented in software as an executable computer program and is executed by a general purpose digital computer or other suitable digital processing device.

The software may be stored in memory in any suitable format and may include one or more separate programs. The software includes an ordered listing of executable instructions for implementing logical functions. The software may be a computer program, source program, executable program, object code, script, or any other entity including a set of instructions to be performed.

When the method of the invention for calculating Lyapunov exponents is implemented in software, the steps can be stored on any computer readable medium for use by or in connection with any computer related system or method. In the context of this document, a computer readable medium is any electronic, magnetic, electromagnetic, optical, infrared or semiconductor system, apparatus, device or propagation medium, or other suitable physical device or means that can contain or store a computer program for use by or in connection with a computer related system or method.

In the alternative, the method for calculating Lyapunov exponents may be configured using physical or electrical components, modules, and/or processing means for performing various functions. For example, these functional components, modules, and processing means are capable of varying the initial conditions of a chaotic system model and then calculating trajectories for the chaotic system. Among other things, they are further capable of calculating a Lyapunov exponent for each trajectory.

Lyapunov Exponent

The jth iteration of a map $f(X)$ is written as $$X_j = f^j(X_o), \tag{1}$$

where $X_o$ is the initial value. When a small error $\epsilon_n$ is found to grow exponentially, the system is said to be chaotic. The error in the jth iteration is found using the chain rule as $$\varepsilon_j = \varepsilon_o \prod_{i=0}^{j-1} |f'(X_i)|, \tag{2}$$

$$\varepsilon_j = \varepsilon_o e^{Lj}, \tag{3}$$

where Lyapunov exponent L is defined as $$L \equiv \lim_{j \to \infty} \frac{1}{j} \prod_{i=0}^{j-1} \ln|f'(X_i)|. \tag{4}$$

Equation 3 can be written as $$L(j) = \frac{1}{j} \ln(\varepsilon_j/\varepsilon_o). \tag{5}$$

The ratio $|\epsilon_j/\epsilon_o|$ gives the total error magnification and its log gives the number of digits needed to express the error growth. The number of lost digits is given by the number of digits in the error. From Equation 2, $$\epsilon_{j+1} = f' \epsilon_j. \tag{6}$$

This means the current error is magnified by the local slope to produce the next error, and the local error increases or decreases when the local slope is greater than one or less than one. The Lyapunov exponent is the result of these error magnifications. Chaos exists in a system when its trajectories spend the majority of time in regions where the magnitude of the slope is greater than 1. A range in the abscissa is magnified by the slope to produce a range in the function $f(x)$. It is important to note that the local Lyapunov exponent, given by the accumulated error for any finite length trajectory segment, is due to the products of local slopes that the segment encounters. This is the cause of the variation in the local exponents and produces the distributions, discussed later. This also causes the noise seen in maximal Lyapunov exponent plots. Equation 4 can be rewritten by isolating $f'$ from Equation 6:

$$L(j) = \frac{1}{j} \prod_{i=0}^{j-1} \ln|\varepsilon_{i+1}/\varepsilon_i|. \tag{7}$$

For numerical calculations this is more rapidly computed from $$L(j) = \frac{1}{j} \ln\left(\prod_{i=1}^{j} \varepsilon_i/\varepsilon_{i-1}\right). \tag{8}$$

Also note that $$\varepsilon_j/\varepsilon_o = \prod_{i=1}^{j} \varepsilon_i/\varepsilon_{i-1}. \tag{9}$$

In the past, the use of these equations has been restricted to one-dimensional maps. When used with the lost digits technique, they can be applied to q-dimensional systems, as discussed later.

Determining L(t) from the Rate of Change of Valid Digits

The equations presented herein are valid for discreet maps, systems of differential equations, or any other time-evolution process. One can switch from using a discrete iteration count (j) to a more general time evolution (t). It can be demonstrated that Equations 5, 7 and 8 are also valid in any time evolution including recursion relations or q-dimensional systems of differential equations, when the error $\varepsilon$ is replaced with $|X_d - X_s|$.

As described herein, the rate of change of valid digits dn/dt can be determined by continually comparing single-precision calculations with double-precision calculations of the system trajectory, in which $X_s(t)$ and $X_d(t)$ represent the system's trajectory at a single precision level and a double precision level, respectively. $W_s$ is the number of significant digits in single precision and $W_d$ is the number of significant digits in double precision.

The single precision level, or lower precision, may be defined by a variable using a first number of bits, e.g. 16 bits. The double precision level, or higher precision, may be defined by a variable using a second and higher number of bits, e.g. 32 bits. In addition, a quad precision level, e.g. 64 bits, may be used. Other levels of precision may be used in accordance with the capabilities of available processing equipment. Multiple precision levels can be used.

The different levels of precision of the system's trajectory are thus computed with $W_s$ and $W_d$ significant digits, where $W_d > W_s$. Initially the two solutions are assigned the same value (the numerical representation error results in a difference in the last bits):

$$X_s(t=0) = X_d(t=0) = X_0. \tag{10}$$

Initially, the $W_s$ most-significant digits of $X_d(t)$ agree with the corresponding digits of $X_s(t)$, and the number of valid digits is n(t=0)=W. The two copies of the system are then independently integrated or iterated with respect to time. At any later time only the n(t) most significant digits of $X_s(t)$ are seen to match the corresponding digits of $X_d(t)$. For chaotic systems with exponential error growth, n(t) decreases linearly in time.

Since $X_d(t)$ is always known to a greater precision than $X_s(t)$, the error in $X_s(t)$ can be written as:

$$\varepsilon(t) = |X_s(t) - X_d(t)|, \tag{11}$$

and the fractional error is:

$$\phi(t) = \left|\frac{X_s(t) - X_d(t)}{X_d(t)}\right|. \tag{12}$$

The Lyapunov exponent can be calculated from Equation 5 with $\varepsilon_0 = |X_s(0) - X_d(0)|$, when the initial values are set so as to avoid a zero in the denominator:

$$X_s(0) = X_d(0)[1 + 2 \cdot 10^{-W_s}]. \tag{13}$$

Note that computers can more accurately represent numbers that are integral powers of two, and that they treat $X_s(0)$ as a binary number.

To demonstrate that the Lyapunov exponent can be viewed as the rate of change in the number of valid digits, we consider the case of the logistic map, $X_{j+1} = rX_j(1-X_j)$, where all $X_j$'s are in the range 0 . . . 1. With $\varepsilon_0 = 10^{-(W_s+1)}$, Equation 5 is approximated for the case of the logistic map, as $$L(j) = \ln(10)\frac{W_s + 1 + \log_{10}\varepsilon_j}{j} = \frac{m_j}{j}\ln(10). \tag{14}$$

The non-integral number of digits needed to write down the error is $\log(\varepsilon)$ so this numerator m(t) is seen to represent the number of decimal digits that have been lost $$m = \log\left|\frac{\varepsilon_j}{\varepsilon_o}\right|$$

(also represents the number of decimal digits lost). The Lyapunov exponent is then $$L = -dn/dt \approx -(n_{final} - n_{initial})/t = m(t)/t, \tag{15}$$

where t is the elapsed time in a continuous system or the number of iterations in a discrete map. The derivative dn/dt is found to be a constant so that it can be replaced by m/t.

More generally, m should be found from $$m(t) = \log\left|\frac{X_s(t) - X_d(t)}{X_d(t)} 10^{W_s}\right|. \tag{16}$$

For example, if the error is 1% and $W_s=8$, then log $|0.01 \cdot 10^8| = 6$. That is, six decimal digits are lost. Equations 15 and 16 lead to $$L(t) = \frac{\ln(10)}{t}(W_s + \log\phi), \tag{17}$$

where $W_s$ is written as a decimal number. The units of the Lyapunov exponent are digits lost per time step. Because Equation 5 is expressed as a natural exponential function, the base of the digits is e. We can choose to write m to be in any base b by expressing the error growth (Equation 5) as $\varepsilon_j = \varepsilon_0 b^{Lj}$. The natural base is used in order to compare the results with those of prior publications.

The time evolution might be the successive iterations of a map, successive time steps of a system of differential equations, successive terms of a recursion relation, successive partial sums of a series or any function of time, $f(t)$, including quantum mechanical functions. $X_s(t)$ and $X_d(t)$ can also be two repeated runs of an experiment if enough significant digits are initially available. In the past, these systems could only be evaluated as time series, and hundreds or thousands of points were needed to compute the Lyapunov exponent. The present lost digits technique can be applied to as few as about 50 iterations.

To implement the lost-digits technique, the system is integrated or iterated until most of the digits of $X_s$ and $X_d$ disagree. For example, the system is evolved until an error threshold $$\epsilon > 0.01 X_d \qquad (18)$$

is reached. This arbitrary criterion can be referred to as the lost digits stopping point. Equations 17 and 18 represent the lost digits technique. An algorithm for calculating the Lyapunov exponents using this method and any currently existing computer code follows. The choice of 0.01 for this fractional error is arbitrary and may be replaced by any other suitable fraction. When $\epsilon$ is allowed to grow to involve the most significant digits, then the widths of the local exponent distributions become smaller, the width going to zero as $W_s \to \infty$. Note that the error $\epsilon$ can never become infinite. If desired, $W_s$, can be replaced by $-\log\epsilon_0$, and Equation 17 leads to $$L(t) = [-\ln(\epsilon_0) + \ln(\phi)]/t. \qquad (19)$$

It should be pointed out that the information content of a particular decimal digit is not 100% lost until the error has grown to reach the next larger decimal digit. That is, when $\epsilon > 0.01 X_d$, the second most significant decimal digits of $X_s$ and $X_d$ begin to disagree and the third most significant decimal digits fully disagree. This is the meaning of the fractional value of $\log(\epsilon)$ and is the reason that the initial error is chosen to be $10^{-(W_s+1)}$.

With $\epsilon_i = |X_d(t) - X_s(t)|_i$ Equation 7 becomes $$L(t) = \frac{1}{t}\ln\left\{\prod_{i=1}^{t} \frac{[X_d(t) - X_s(t)]_i}{[X_d(t) - X_s(t)]_{i-1}}\right\}, \qquad (20)$$

where t is the number of iterations in a discrete map or the elapsed time in a differential equation. Equations 5, 19, or 20 can be used in place of Equation 17 in the lost digits technique. The product is initialized to 1 and then continually multiplied by $\epsilon_i/\epsilon_{i-1}$ until the stopping point is reached. No significant difference has been seen between calculations using Equations 5, 17, 19, or 20. That is, they are within the existing noise.

An algorithm to calculate the Lyapunov exponents follows. Initially $X_d = X_s$ and $X_s$ equals some value. The system is propagated in time in both single and double levels of precision. The difference between the single and double precision results is calculated: $\epsilon = |X_d(t) - X_s(t)|$. If $\epsilon > 0.01 X_d$, then L can be calculated from Equations 5, 7, 8, 17, 19, or 20. This algorithm can be incorporated into any currently existing computer code. This algorithm has been tested in map systems and liquid flow systems, and compared with published values. In all cases the results using this simple algorithm are in agreement with accepted values. Several examples are illustrated, but some however, such as the following, are not illustrated:

1) the logistic equation in an intermittency regime near a tangent bifurcation (e.g., slightly below the period-3-window at parameter $r = 1 + \sqrt{8}$);
2) highly nonlinear one-dimensional maps, e.g. the tenth iteration of the logistic equation $g(x) = f^{10}(x) \equiv f \circ f^9(x)$.

Q-Dimensional Systems

In the case of a q-dimensional system, whether the equations are discrete maps or continuous flows, we have $X^{(i)}$ ($i=1 \ldots q$) for each of the single and double precision trajectories. Analogous to Equation 1, $$X_j^{(i)} = f_1(X_{j-1}^{(1)}, \ldots, X_{j-1}^{(q)}), \qquad (21)$$

and the differential errors grow in time according to $$\begin{bmatrix} dX_j^{(1)} \\ \vdots \\ dX_j^{(q)} \end{bmatrix} = \begin{bmatrix} \frac{\partial f_1}{\partial X^{(1)}} & \cdots & \frac{\partial f_1}{\partial X^{(q)}} \\ \vdots & \ddots & \vdots \\ \frac{\partial f_q}{\partial X^{(1)}} & \cdots & \frac{\partial f_q}{\partial X^{(q)}} \end{bmatrix} \begin{bmatrix} dX_{j-1}^{(1)} \\ \vdots \\ dX_{j-1}^{(q)} \end{bmatrix}. \qquad (22)$$

We have found that an error in any of the q coordinates increases the error in all the other coordinates. For example, $dX_j^{(i)}$ is a result of all $dX_{j-1}^{(i)}$. This means that the maximal Lyapunov exponent can be calculated from any of the q coordinates. These error magnifications are the ratios of the successive differentials $$dX_j^{(i)}/dX_{j-1}^{(i)}. \qquad (23)$$

The maximal Lyapunov exponent is then (as in Equation 8)

$$L(t) = \frac{1}{t}\ln\left(\prod_{j=1}^{t} \frac{dX_j^{(i)}}{dX_{j-1}^{(i)}}\right), \qquad (24)$$

independent of index i. This can be replaced by (see Equation 9)

$$L(t) = \frac{1}{t}\ln\left(\frac{dX_j^i}{dX_o^i}\right). \qquad (25)$$

Analogous to the one-dimensional case (see Equation 6), the jth error is due to the product of the q local slopes and the previous error, i.e., $$\frac{dX_j^{(i)}}{dX_{j-1}^{(i)}} = \frac{\sum_i \left|\frac{\partial g_i}{\partial X^{(i)}}\right| dX_j^{(i)}}{\sum_i \left|\frac{\partial g_i}{\partial X^{(i)}}\right| dX_{j-1}^{(i)}} \qquad (26)$$

where $g \equiv f(t-1)$. This ratio of successive differentials can be calculated numerically with the partial derivatives written in terms of the coordinates (at the jth step for the numerator and the (j−1)th step for the denominator) and the errors taken as $dX_j^{(i)} = \epsilon_j^{(i)} = |X_{j,s}^{(i)} - X_{j,d}^{(i)}|$, where $X_{j,s}^{(i)}$ is $X_j^{(i)}$ calculated using single-precision arithmetic and $X_{j,d}^{(i)}$ is $X_j^{(i)}$ calculated using double-precision arithmetic. The situation does not exist where $dX_j^{(i)}$ continually grows while $dX_j^{(k)}$ continually shrinks because the accumulated error indicated by either $dX_j^{(i)}$ or $dX_j^{(k)}$ is due to the sum of the errors in all $dX_{j-1}^{(i)}$. In fact, the rate of growth of the errors is independent of the coordinate i, so the maximal Lyapunov exponent is determined from any of the $\epsilon_j^{(i)}$.

Equations 24 and 26 are combined to calculate the maximal Lyapunov exponent $$L(t) = \frac{1}{t} \ln \left[ \frac{\sum_i \left| \frac{\partial f_i}{\partial X^{(i)}} \right| dX_t^{(i)}}{\sum_i \left| \frac{\partial f_i}{\partial X^{(i)}} \right| dX_o^{(i)}} \right] \text{ or} \qquad (27)$$

$$L(t) = \frac{1}{t} \ln \left[ \prod_{j=1}^{t} \frac{\sum_i \left| \frac{\partial f_i}{\partial X^i} \right| dX_j^i}{\sum_i \left| \frac{\partial f_i}{\partial X^i} \right| dX_{j-1}^{(i)}} \right]. \qquad (28)$$

This is a new formula which produces results indistinguishable from those obtained using Equations 5, 17, 19, or 20. The new q-dimensional form of Equation 2 is $$dX_j^{(i)} = dX_o^{(i)} \prod_{j=1}^{j} \frac{\sum_i \left| \frac{\partial f_i}{\partial X^{(i)}} \right| dX_j^{(i)}}{\sum_i \left| \frac{\partial f_i}{\partial X^{(i)}} \right| dX_{j-1}^{(i)}} \equiv dX_o e^{Lj}. \qquad (29)$$

Finally, it should be noted that this technique is computationally advantageous to techniques using Runge-Kutta algorithms such as the Bennetin and Wolf algorithms. Although the present technique requires calculating two distinct trajectories (using single and double precision), the previous techniques require one trajectory in double precision plus an associated system of $q^2$ dimensions stemming from the Jacobian of the system. The Runge-Kutta and Gramm-Schmidt procedures require a great deal of additional calculations. In addition, the error in these other techniques is not $10^{-Ws}$, but set to unit magnitude.

Results

Equation 17 or 20 provides a procedure for the direct measurement of Lyapunov exponents. The system is run twice from identical initial conditions for an elapsed time and then the difference between the two runs is calculated throughout the elapsed time. A more expensive approach is to build two exact copies of the system, run them simultaneously, and compare them with respect to time. For instance, $X_s(t)$ and $X_d(t)$ are replaced by $X_1(t)$ and $X_2(t)$, where $X_1(t)$ and $X_2(t)$ are either the two runs of the system or the two copies of the system. At t=0 the two runs agree to several significant digits. If the system is chaotic then the number of digits that agree in $X_1(t)$ and $X_2(t)$ decreases linearly in time.

Implementation Details

In applying the lost digits technique, the following considerations should be taken into account. First, more choices than merely single and double precision may be available, and in this case the two most precise precision levels should be used. For example, 16 and 20 digit variables have been compared to obtain the described results. Second, because the maximum magnitude of an error depends on its position within the trajectory, it is better to set the stopping criteria to a floating fractional error rather than to a constant error magnitude. Third, it is best to iterate or integrate until most of the digits of $X_s$ and $X_d$ have come to disagree, e.g. a fractional error of 0.01 is used in the calculations herein. Fourth, in a modulus map the difference might be determined before performing the modulus. Sometimes one precision falls below the cutoff while the other falls above it. Fifth, a large elapsed time or number of iterations is necessary to determine a small positive L. For this reason, a maximum elapsed time should normally be set in the program. Sixth, negative exponents can be calculated by starting two solutions with a small difference, such as 1%, and then watching an increase in the number of agreeing digits. And seventh, it is well known that the computed trajectories must be found to be independent of the numerical integration step size.

The lost digits Lyapunov exponent is not due to a single iteration or integration time step, or an infinite number of them. It is due to a small number of time steps. For the lost digits approach for $W_s=16$, about 50 to 100 iterations are needed to determine a good approximation to the global exponent in the logistic map, compared to about 10,000 iterations which are used in the conventional infinite-sum formula for the global exponent of a map (Equation 4). The Lyapunov exponent can be calculated from the product of the 50 or so error magnifications that the trajectory encounters. For the Lorenz equations (with $W_s=16$) the lost digits technique as described herein determines an exponent after every ten-second trajectory segment. For this reason, the lost digit approach can be said to produce only regional exponents. The lost-digits technique produces a global exponent only for the case $W_s \to \infty$.

Logistic Map

An example of a period-3 window of a logistic map is shown in FIG. 1. The power of this lost digits technique is demonstrated by calculating a few iterations of the logistic map, $X_{j+1}=rX_j(1-X_j)$. We consider r=3.853, $W_s=16$, and initially set $X_s(t=0)=X_d(t=0)=X_o=0.65$. The system is iterated until the stopping point is reached. The next experiment is reinitialized by setting $X_s(t)=X_d(t)$ and the process is repeated. In this region of the map (r=3.853), the iterations typically move from band A to band B to band C and then back to band A, Table 1.

TABLE 1

| Band | X | Width | f (X) | Slope |
|---|---|---|---|---|
| A | X ∈ 0.132 to 0.165 | 0.033 | f (X) ∈ 0.451 to 0.528 | >1 |
| B | X ∈ 0.451 to 0.528 | 0.077 | f (X) ∈ 0.957 to 0.968 | <1 |
| C | X ∈ 0.957 to 0.968 | 0.011 | f (X) ∈ 0.132 to 0.165 | >1 |

For bands A, B and C the local slopes are always >1, <1, and >1, respectively. Therefore, the error grows for two iterations and then shrinks once when the iteration lands in the central band. The error shrinks when the iteration lands in the central band because the slope is less than one at this location. Therefore, the lost digits stopping point can never be reached when the iteration lands on this central band. The initial value $X_o$ usually is not located on any of the three bands. The iteration lands on the central band at the kth iteration. The band revisits every third iteration k+3j, where j=1, 2, 3. . . . In addition, the lost digits stopping point is usually reached after the second successive error growth iteration out of the grow-grow-shrink pattern, so that the stopping point occurs only in integer multiples of three iterations, i.e. the elapsed time, the denominator in Equation 5, only contains the integers k+2+3j. This is shown in the histogram of iteration counts needed to reach the lost-digits stopping point, FIG. 2.

Figure 3:
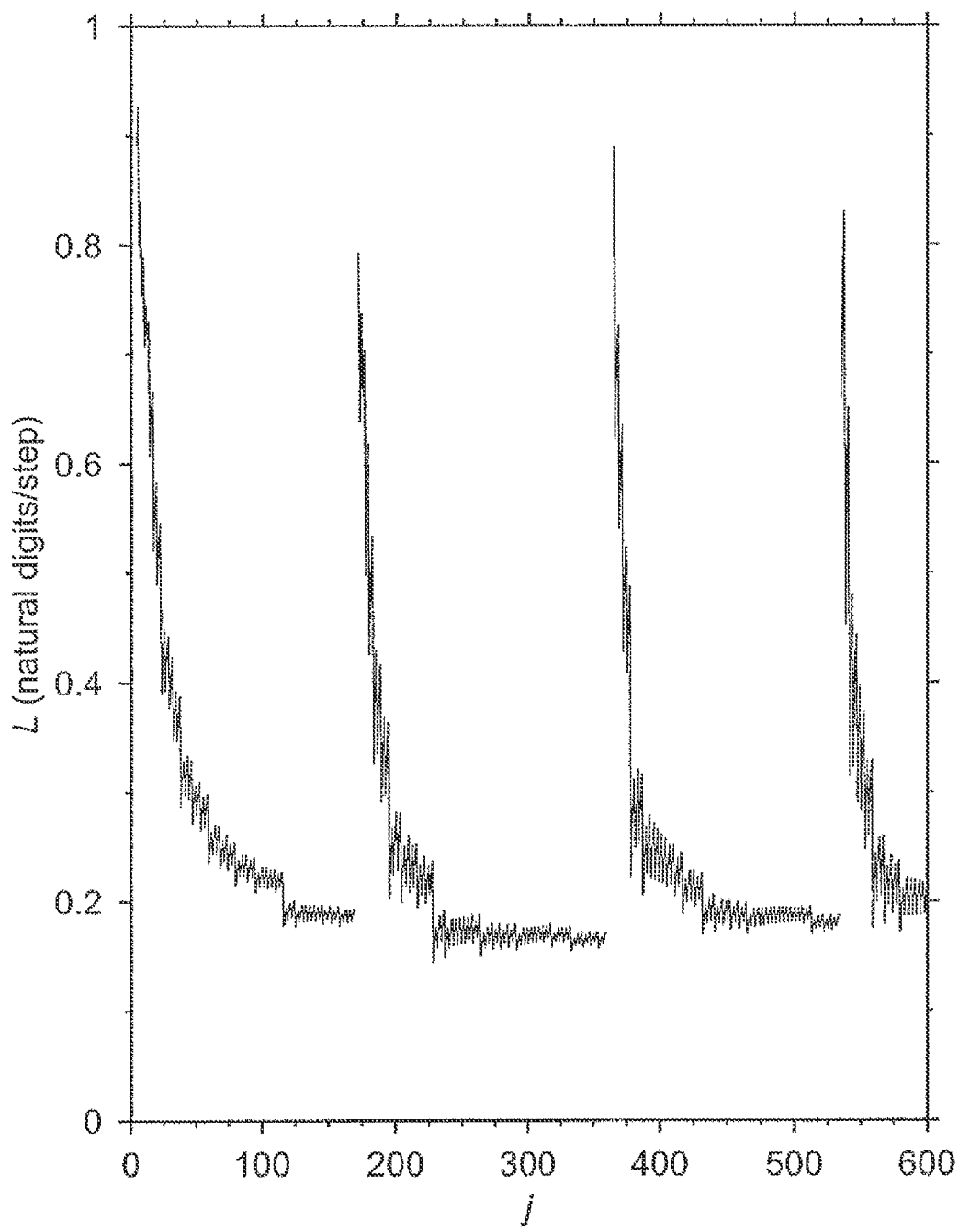
FIG. 3 is a graph showing the convergence of the maximum Lyapunov exponent over time.

FIG. 3 shows the Lyapunov exponent calculated as a function of iteration count. The plot shows how the exponent asymptotically approaches a final value as the count increases. When the stopping point is reached, $X_s(t)=X_d(t)$ is reseat and the process repeated. FIG. 3 shows a sequence of three successive local exponent calculations for r=3.8353. The three successive decays shown required 170, 190, and 174 iterations before reaching their stopping points. Note especially the periodic structure in the noise in FIG. 3. The calculated error decreases when the iteration lands on the central band and increases when the iteration lands on the other two bands. Consequently the calculated Lyapunov exponent is smaller if the experiment is stopped when the iteration lands on the central band and is larger if the experiment is stopped on the other two bands. As the number of iterations increases, the amplitude of these oscillations dies down. This plot demonstrates that a meaningful exponent has not been computed until enough digits have been lost so that the exponent approximates its asymptotic value. This also means that the lost digits technique does not normally produce a single step local exponent. This result can also be reached if we consider the three bands in the case of Table 1. Since the error and Lyapunov exponent grows on two bands and recedes on one band, the first iteration is usually unable to determine the value of the Lyapunov exponent or even the correct sign.

Figure 4:
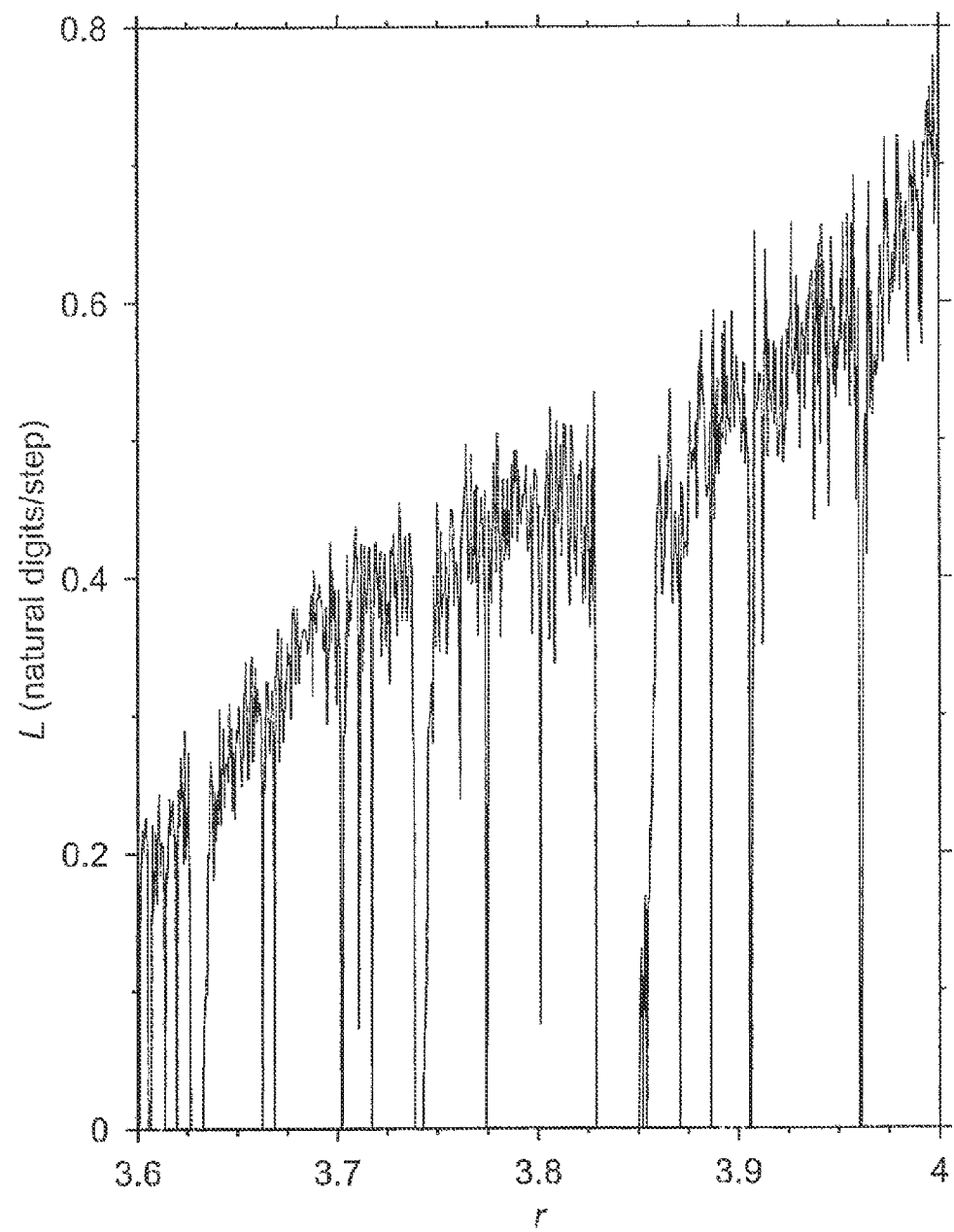
FIG. 4 is a graph of a Lyapunov exponent for the logistic map of FIG. 1.

FIG. 4 discloses a plot of the Lyapunov exponent for the logistic map. This plot is rapid to produce but noisy. Each trajectory has its own exponent and the noise is produced by the natural variation of the local exponents. If desired, the noise can be reduced by averaging. The averaging of exponents has been performed in three different ways:

1) averaging iterations over precisions;
2) averaging over k initial conditions, i.e. setting $X_s=X_d=X_{o,i}$ and iterating until m digits disagree, calculating L, then resetting $X_s=X_d=X_{o,i+1}$, where i=1 ... k, for a set of k initial values (taking the k initial values randomly or by distributing the $X_{o,i}$ uniformly throughout the available space); and
3) averaging through time, that is, starting $X_s=X_d=X_o$, and then after m digits disagree resetting $X_s=X_d$ (in this case the new $X_s$ is already in the attractor region) and repeating the process k times. The average maximal exponents are insensitive to the averaging process.

Figure 2:
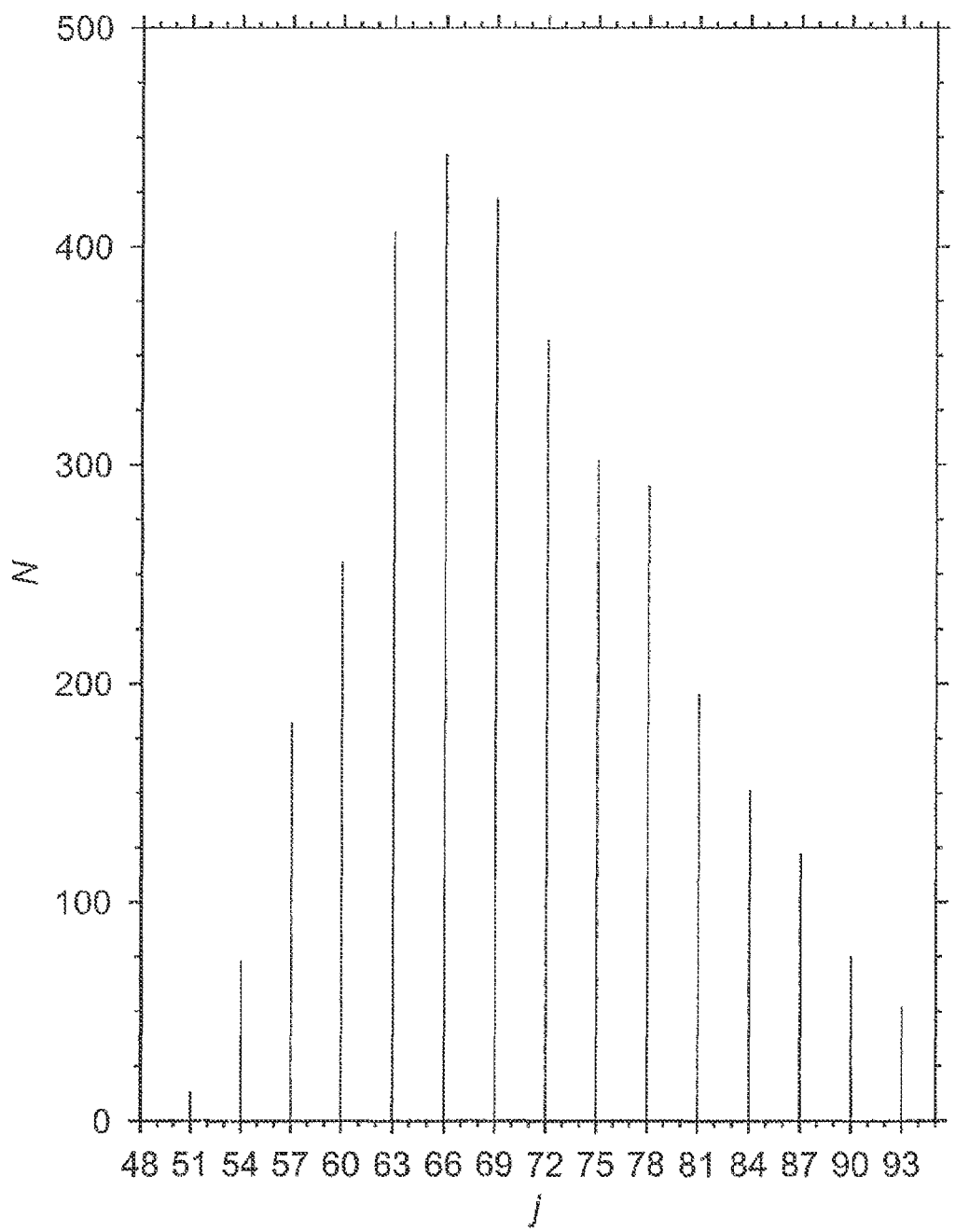
FIG. 2 is a histogram of an iteration count for the logistic map of FIG. 1.
Figure 5:
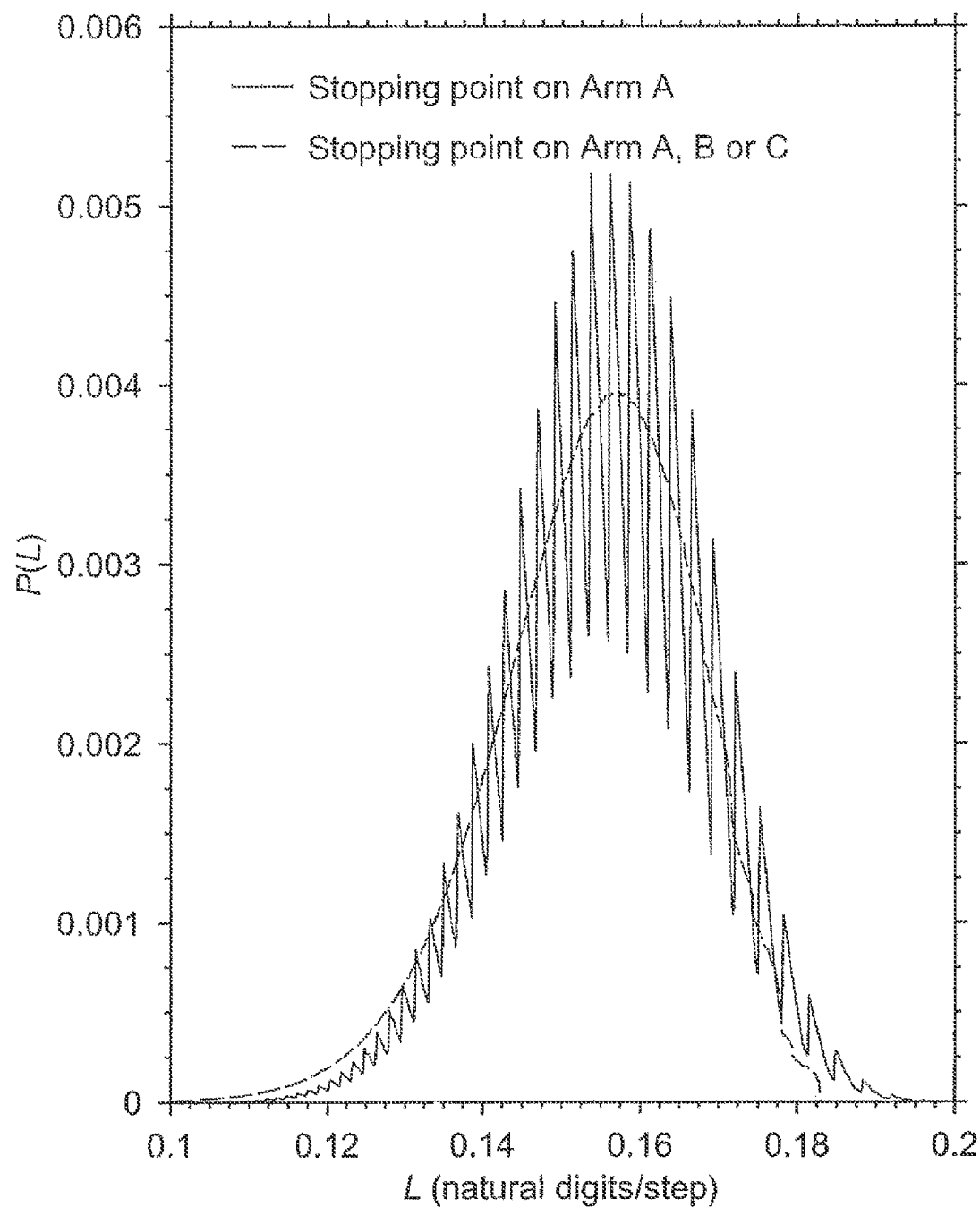
FIG. 5 is a graph of a normalized distribution of local Lyapunov exponents for the logistic map of FIG. 1.

Each trajectory produces a local Lyapunov exponent. Local Lyapunov exponents reveal the variation of the local error exponential growth rate throughout the system's trajectory. A plot of the distributions of local exponents for the parameters of FIG. 2 is shown in FIG. 5. The parameter values in FIG. 5 were chosen near the end of a periodic window where oscillations appear in the distribution (solid line). These oscillations are an artifact, a result of the stopping point criterion never being satisfied on bands B or C. The oscillations can be removed by iterating a randomly selected number of times (i=1, 2, or 3) after the stopping point is reached or by terminating the experiment after a set amount of time or number of iterations, but not so few that the asymptotic value has not been reached, nor so many that the fractional error exceeds unity. FIG. 5 also shows the distribution (dashed line) when the method of terminating the experiment is chosen. In this case, the map is in a restricted error region as defined below. Note that most Lyapunov distributions are smooth and do not contain these oscillations. Although the artifact is easily removed from the distribution, it is of interest because it indicates that the map has an interesting or unusual region.

Restricted-Error Regions

Consider a one-dimensional map $X_{j+1}=f(X_j,r)$, with parameter r. The range of the iteration is $X_{min}(r, t) \leq X_j(r, t) \leq X_{max}(r, t)$. At a particular chaotic parameter value $r_h$ the range of X is restricted to a smaller segment composed of a set of separate, disjoint regions numbered i=1 to k. These k regions, or bands, restrict the iterations to the values, $X_{i,min} \leq X_j(r_h,t) \leq X_{i,max}$. If the iteration moves through time in a permanent pattern from the first region to the second region and so on to the kth region then back to the first region, for all time, then the iterations $X_j$ are always known to within a maximum error equal to the width of the largest region. When the Lyapunov exponent is positive for a particular range of r values, but at least one valid digit is retained in the computed trajectory. We refer to that parameter region as a restricted error region. When at least one digit is always known. The trajectory is not 100% uncertain. A physical system is always limited to a finite phase space. These restricted error regions always occur near the ends of periodic windows where the system is returning to chaos. These regions are readily apparent in the bifurcation diagrams and Lyapunov exponent plots of published systems. They become smaller in higher period windows, which increases the number of digits that remain valid. These bands have been investigated in the past by Lorenz. The edges of the regions have been extensively studied as crisis points. The scaling properties of the windows are known. Gade and Amritkar developed time-dependent generalized exponents that measure the loss of memory with time in a chaotic time series. These references report an example for the logistic map, at the chaotic parameter value r=3.59687 (L>0 at this point) where the memory is not completely lost. This is a two band region of the logistic map. It was noted in these references that the iterations hop between the two bands in a permanently set pattern. The restricted error regions are most easily found when maximum errors, rather than local errors, are monitored and can be located by setting the stopping point to be a small constant as discussed above.

We consider a period p window which begins at $r=r_a$, where $$f^p(X, r_a)=X. \tag{30}$$

The window contains its own transition back to chaos. That is, there is a sequence of period doublings followed by the emergence of a set of k restricted coordinate sections at $r=r_\infty$. The periodic window is then seen to end abruptly at $r=r_c$. The restricted error region covers the segment $r_\infty \leq r \leq r_c$. This can be seen in the logistic map of FIG. 1. It is known that $r_c$ occurs at the r value where pairs of super cycles match in value. The super cycles are the first few iterations obtained from setting the initial value to $X_o=X_c$, where $X_c$ is determined from df $(X_c)/dX=0$. The point $r_c$ is then found from $$f^{N+p}(X_c, r_c)=f^{N+2p}(X_c, r_c). \tag{31}$$

Figure 6:
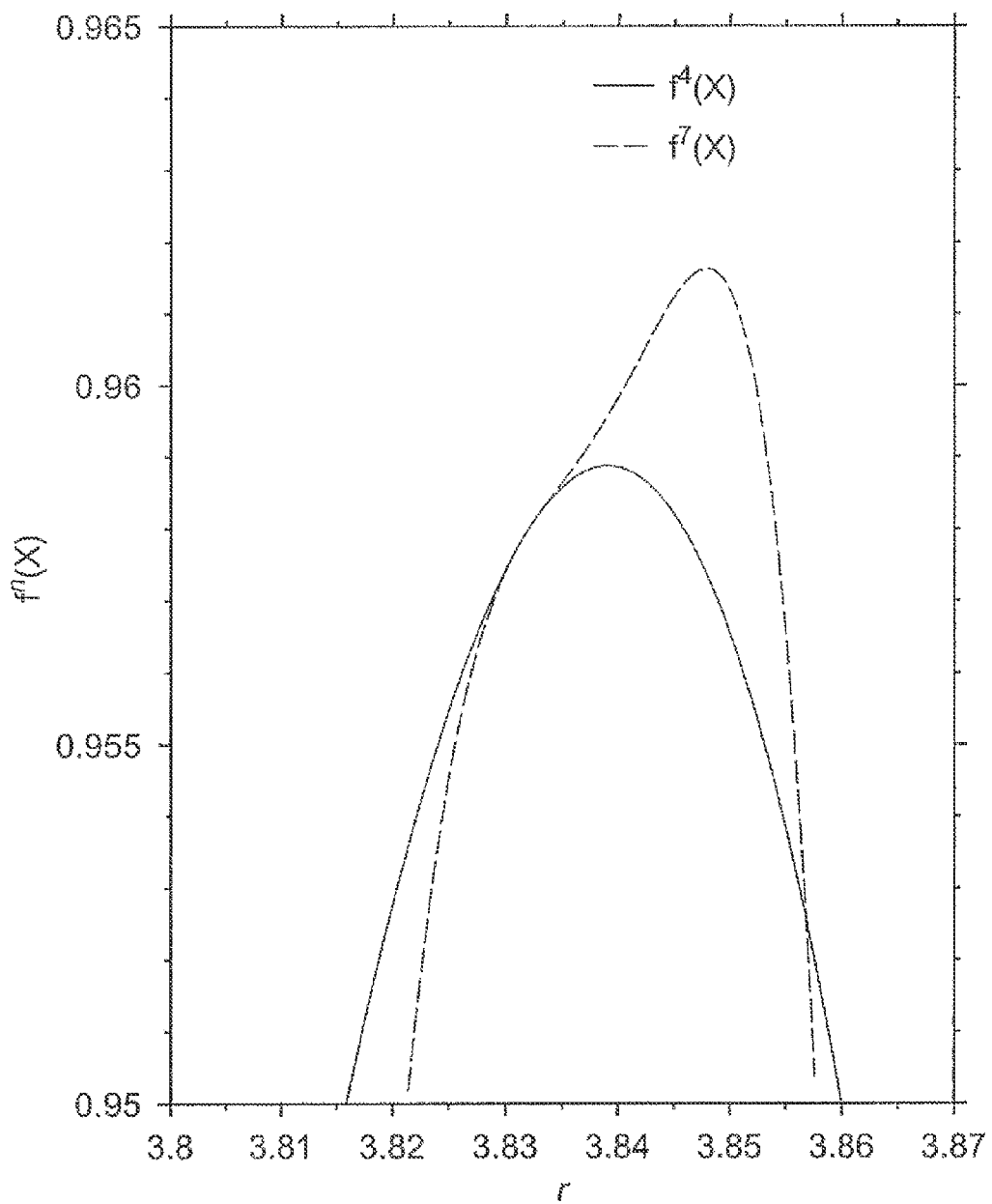
FIG. 6 is a graph of two super cycles for the logistic map of FIG. 1.

We consider the point $r_b$ between $r_a$ and $r_c$ where certain pairs of super cycles also have the same slope, that is, $$f^{(N+p)\prime}(X_c, r_b)=f^{(N+2p)\prime}(X_c, r_b), \tag{32}$$

where the prime (') indicates differentiation with respect to r and N=1 ... p. This is illustrated in FIG. 6, which shows super cycles 4 and 7 for the logistic map. It can be seen that the two super cycles have equal slope and value, then have equal slope but unequal values ($r_b$), and then later have equal values but unequal slopes ($r_c$).

For example, the period-3 window of the logistic map (with $X_c$=0.5) begins at the point $f^3(X)=X$, or $r_a=1+\sqrt{8}\approx3.828427125$ (see FIG. 1) and ends at the point where the super cycles have the same value, that is $f^{N+p}(X_c, r_c)=f^{N+2p}(X_c, r_c)$, where p=3, and N=1 ... p. The pair $f^7(X_c, r_c)=f^4(X_c, r_c)$ gives $r_c$=3.856800696. Point $r_b$ is given by $f^{4\prime}(X_c, r_b)=f^{7\prime}(X_c, r_b)$. The average $r_b$ for the (4, 7) and (5, 8) and (6, 9) pairs is $r_b$=3.85064. The r co value for the period-3 window is $r_\infty\sim3.84950$. It can be found in this and numerous other calculations that $r_b \sim r_\infty$. This result is useful, since the $r_\infty$ value is much more difficult to determine than the equal slope condition.

Two-Dimensional Map

We consider the maximal Lyapunov exponent for a two-dimensional map taken from Sagdeev:

$$\begin{bmatrix} X_{j+1} \\ Y_{j+1} \end{bmatrix} = \begin{bmatrix} r+1 & 1 \\ r & 1 \end{bmatrix} \begin{bmatrix} X_j \\ Y_j \end{bmatrix} \quad (33)$$

The Lyapunov exponents are the natural logs of the eigenvalues of the Jacobian matrix for the map and are given by the following equation:

$$L\pm = \ln\{1 + r/2 \pm [(1+r/2)^2 - 1]^{1/2}\}. \quad (34)$$

Figure 7:
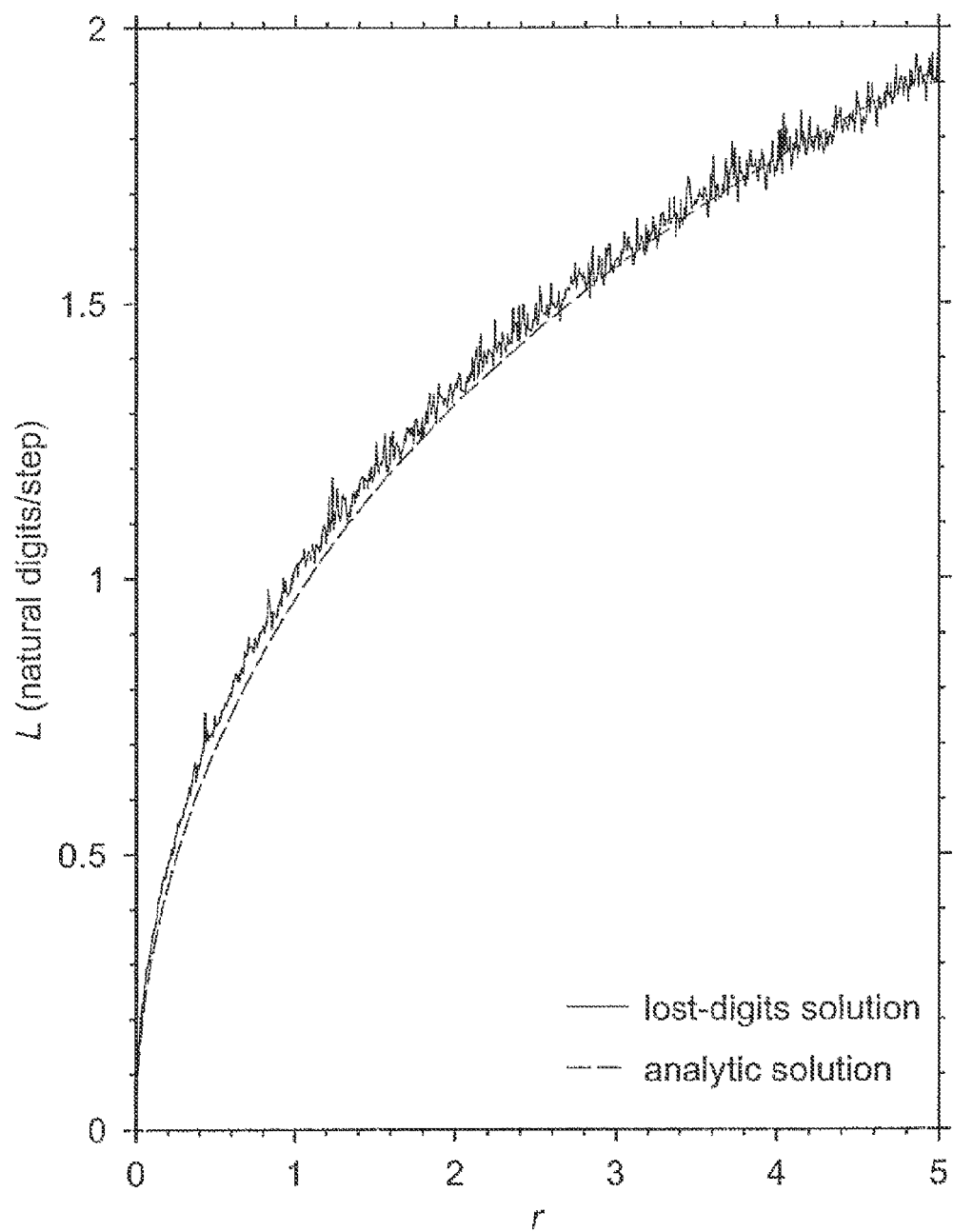
FIG. 7 is a graph of the maximum Lyapunov exponent for a two-dimensional map and analytic curve.

FIG. 7 shows the Lyapunov exponents using the lost digits technique (solid line) and the analytic solution (dashed line) for the largest Lyapunov exponent for this map. The lost digits technique is able to quickly reproduce the results of Equation 34.

Figure 8:
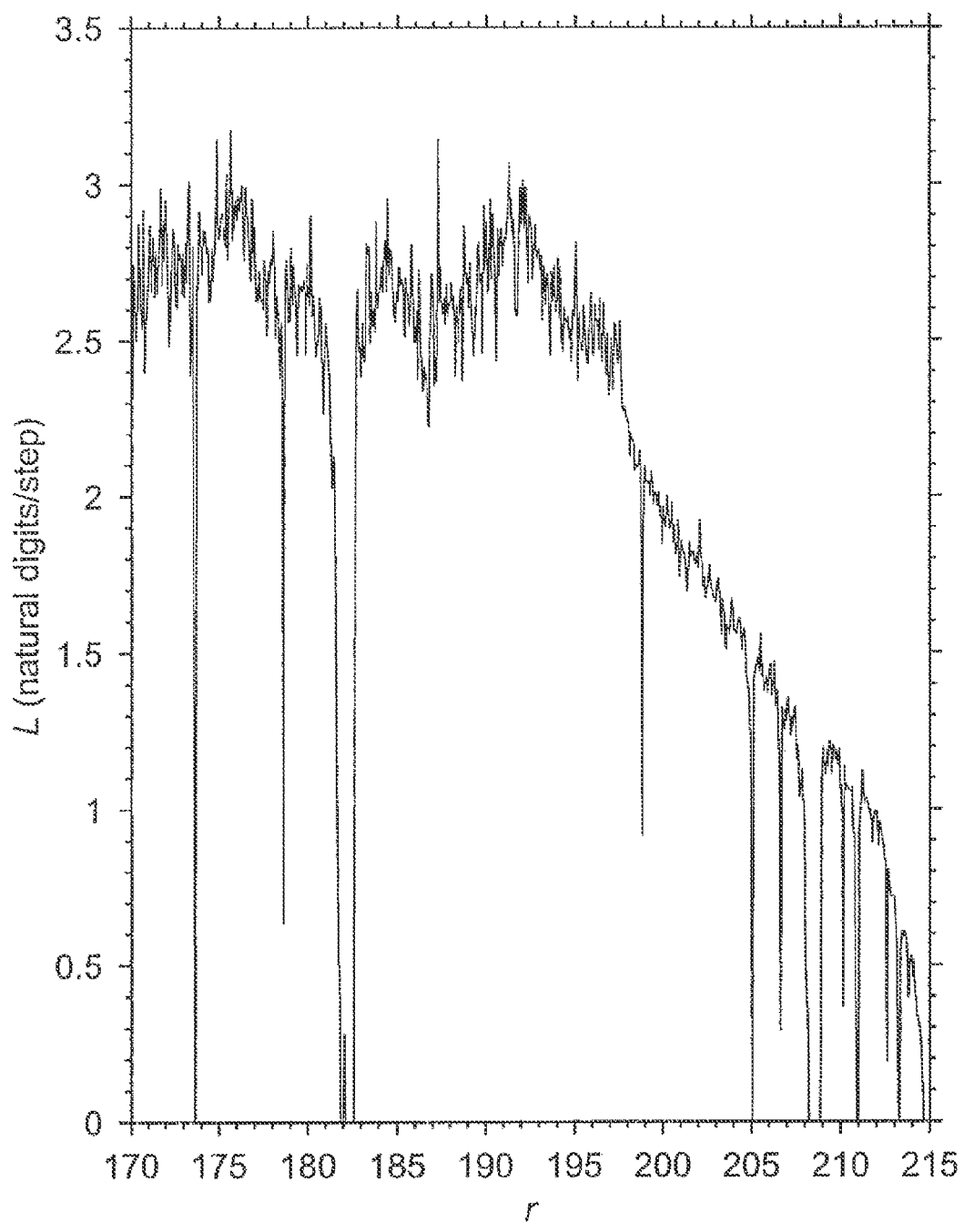
FIG. 8 is a graph of the maximum Lyapunov exponent for the Lorenz equations averaged over nine exponents.

The Lorenz equations are $$dx/dt = -ax + ay \quad (35)$$

$$dy/dt = cx - y - xz \quad (36)$$

$$dz/dt = xy - bz \quad (37)$$

where a=10, b=8/3, and the parameter c is varied from 170 to 215. The lost digits Lyapunov exponents are computed by comparing 16 and 20, for example, significant digit solutions with a stopping point given by Equation 18. The lost digits exponent is averaged over 9 initial conditions using a constant Runge-Kutta step size of 0.02 and integrated for a maximum of 100,000 time steps, so that a tiny positive exponent could be found if it occurred. The results, shown in FIG. 8, are virtually identical to the traditional Lyapunov exponent method results shown in the plots given in Schuster (cited reference page 116), and Froyland. The largest exponents found in this plot are L=2.5 natural digits per second. This is about 1 decimal digit per second. This means that 12 decimal digits are lost in about 12 seconds (600 Runge-Kutta time steps). The system completes about two orbits per second when c=190. If a variable time step procedure is used then normally the higher precision calculation should change the step size. The single-precision calculation typically uses the time step that has been determined by the double-precision procedure so that the two precisions stay together in time.

Figure 9:
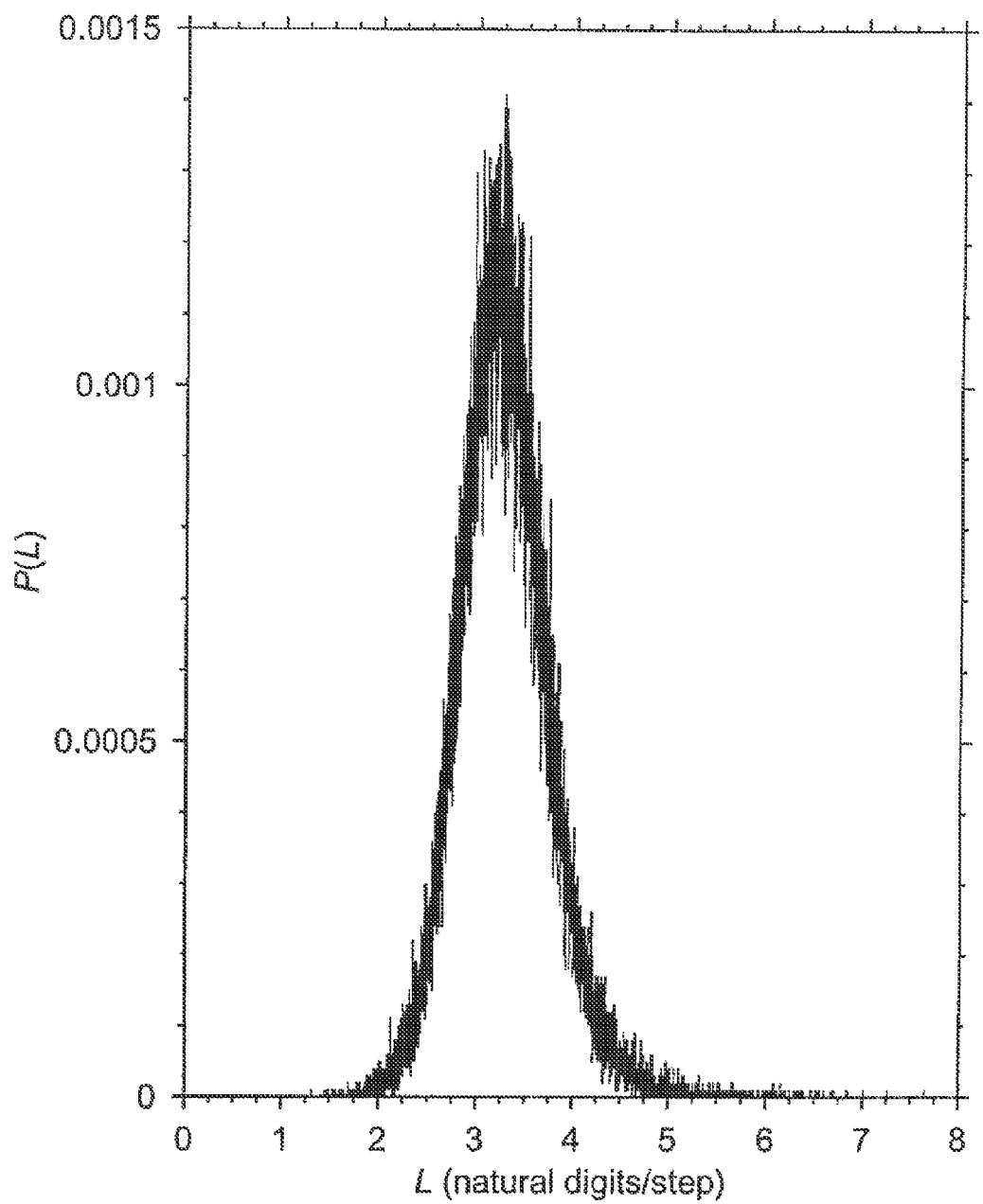
FIG. 9 is a graph of a first normalized distribution of local Lyapunov exponents for the Lorenz system.
Figure 10:
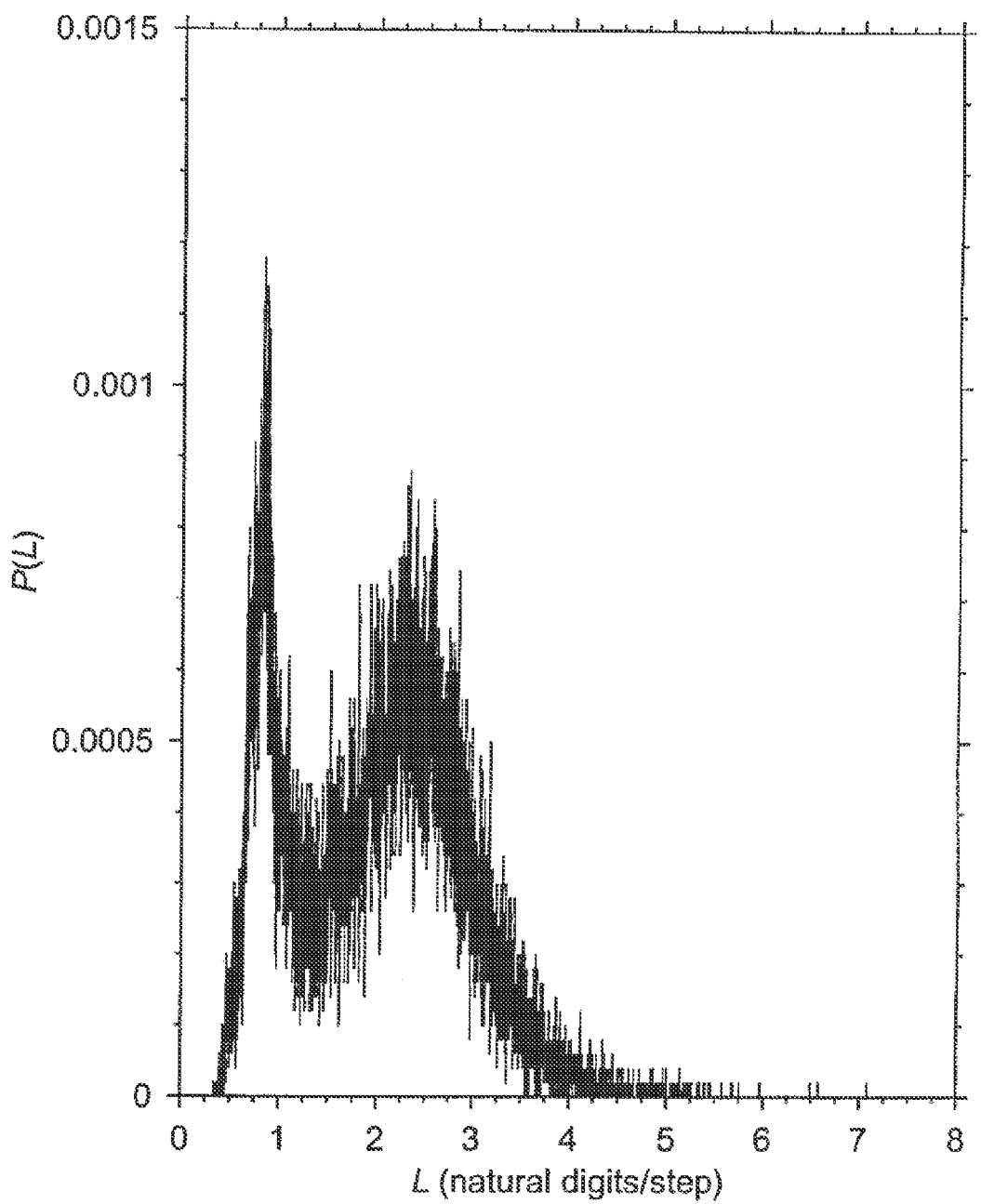
FIG. 10 is a graph of a second normalized distribution of local Lyapunov exponents for the Lorenz system.

For the continuous Lorenz equations at c=190 the distribution is shown in FIG. 9. The distributions can show multiple peaks for chaotic parameter values near the ends of the periodic windows. For example, at c=182.57, with dt=0.02, the distribution contains 3 peaks. This indicates that the trajectory alternates between three exponents, seen in a real time plot, or that the computed trajectory is alternating between three actual trajectories. However, the 3 peaks become a single peak for dt=0.002. This illustrates another effect of a Runge-Kutta time step that is too large. FIG. 10 shows the distribution, with dt=0.02, for c=133.278. In this case, however, the 2 peaks remain when the time step is reduced to dt=0.00002. This case is located near the end of a periodic window. It indicates that liquid flow systems may also display interesting behavior similar to that of the restricted error regions of the one-dimensional maps.

The number of valid digits is a direct measure of the information that is known about a system. This fact can be used to provide several methods of determining Lyapunov exponents. Maximal Lyapunov exponents are determined by the time rate of change of the number of valid digits in the system's trajectory and can be computed by combining the stopping point given by Equation 18 with either of Equations 5, 17, 19, or 20. For a system of differential equations, the stopping point can also be combined with Equation 23, 25, or 26. The Lyapunov exponent can be experimentally measured by comparing two separate runs of a system, and applying Equations 17 and 18. This method allows Lyapunov exponents to be calculated in less than one-tenth of the computational time required by traditional methods. Furthermore, the same algorithm is applied to maps, systems of differential equations, or any numerical time evolution procedure. A new technique involving the products of the ratios of successive differential is also used to find maximal exponents in systems of differential equations. The power of this algorithm is demonstrated by providing Lyapunov exponent plots and local Lyapunov exponent distributions for the logistic map, a two-dimensional map, and the Lorenz equations. Restricted error regions are discussed where L>0, but the error's magnitude is restricted to a fraction of the size of the available phase space.

The distribution of local Lyapunov exponents explains the noise seen in maximal Lyapunov exponent plots. A distribution of local exponents occurs because the error growth rate of any segment of a trajectory is due to the product of local slopes which are encountered by that segment. That is, the variation in local exponents is simply a factor of the variation in local slopes. An oscillation in the distribution indicates that some interesting feature of the trajectory is causing certain integer counts to be absent from the lost digits stopping time. Finally, the magnitude of the system error is found to be specially restricted near the end of periodic windows, even though L>0 in these regions.

Figure 11:
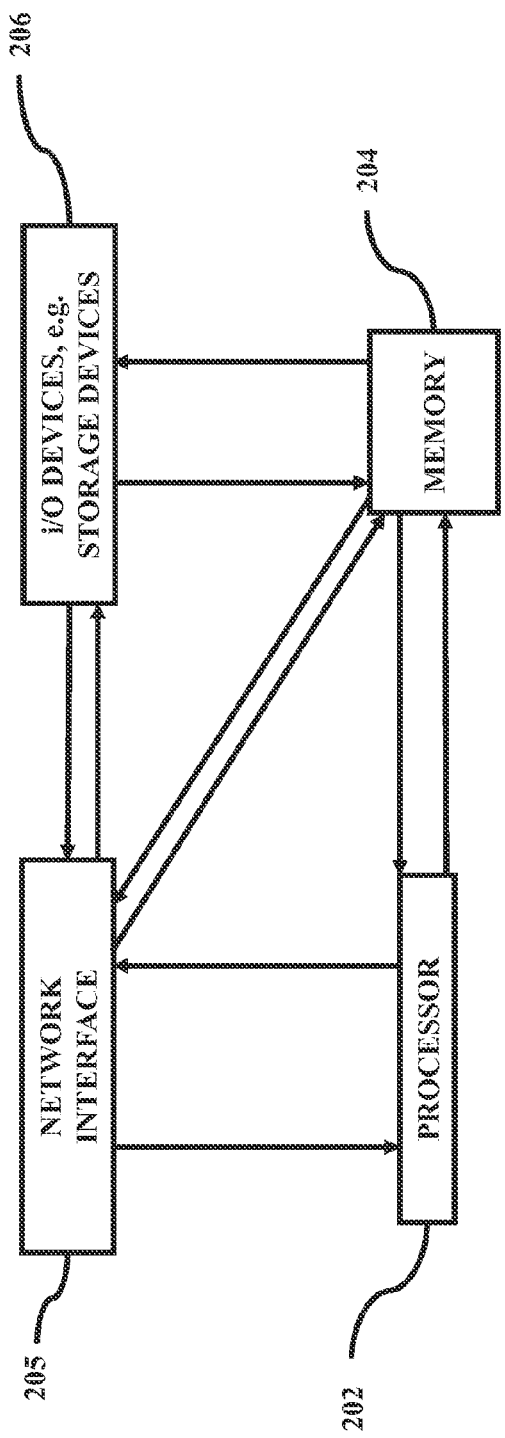
FIG. 11 is a high level block diagram of a general purpose computer suitable for use in performing functions of the software described herein.

FIG. 11 depicts a high level block diagram of a general purpose computer suitable for use in performing the functions described above as well as claimed below. As depicted in FIG. 11, the system 200 includes a processor element 202 (e.g., a CPU) for controlling the overall function of the system 200. Processor 202 operates in accordance with stored computer program code, which is stored in memory 204. Memory 204 represents any type of computer readable medium and may include, for example, RAM, ROM, optical disk, magnetic disk, or a combination of these media. The processor 202 executes the computer program code in memory 204 in order to control the functioning of the system 200. Processor 202 is also connected to network interface 205, which transmits and receives network data packets. Also included are various input/output devices 206 (e.g., storage devices, including but not limited to, a tape drive, a floppy drive, a hard disk drive or compact disk drive, a receiver, a transmitter, a speaker, a display, a speech synthesizer, an output port, and a user input device (such as a keyboard, a keypad, a mouse and the like)). Given the present detailed description of the invention, one of skill in the art could readily implement the invention using programmed digital computers. Of course, the actual implementation of the system in accordance with invention could also include other components not illustrated in FIG. 11. For clarity, such other components are not shown in FIG. 11.

REFERENCES CITED

The following references are hereby incorporated by reference herein.

A. M. Liapunov, Ann. Math. Studies 17, 1947 (1907).
H. G. Schuster, *Deterministic Chaos, An Introduction*, Second Revised Edition, (VCH, Weinheim Germany, 1988), p. 116.
G. Benettin, L. Galgani, and J. M. Strelcyn, Phys. Rev. A14, 2338 (1976).
A. Wolf, J. B. Swift, H. L. Swinney, and J. A. Vastano, Physica 16D, 285 (1985).
J. Froyland, and H. Alfsen, Phys. Rev. A29, 2928 (1984).
E. N. Lorenz, Physica D 35, 299 (1989).
E. N. Lorenz, *Noisy periodicity and reverse bifurcation Nonlinear Dynamics*, edited by R. H. G. Helleman. (New York Academy of Sciences: New York, 1980).
P. M. Gade, and R. E. Amritkar Phys. Rev. Lett. 65, 389 (1990).
P. M. Gade, and R. E. Amritkar Phys. Rev. A 45, 725 (1992).
E. N. Lorenz, J. Atmos. Sci. 20, 130 (1963).
R. Z. Sagdeev, D. A. Usikov, G. M. Zaslaysky, *Nonlinear Physics, From the Pendulum to Turbulence and Chaos*, (Harwood Academic Publishers, Chur, 1988), p. 166.

The foregoing discussion discloses and describes embodiments of the invention by way of example. One skilled in the art will readily recognize from this discussion and from the accompanying drawings and claims, that various changes, modifications and variations can be made therein without departing from the spirit and scope of the invention as defined in the following claims.

What is claimed is:

1. A method of calculating a Lyapunov exponent for a series of time-dependent differential equations describing a chaotic system using a computer processor, wherein the computer processor uses the method comprising:
    selecting a variable in the series of differential equations indicative of a condition in the chaotic system,
    obtaining an initial value of the variable at an initial time t(i),
    selecting a first precision and a second, higher precision for the variable,
    starting with the initial value of the variable at initial time t(i), iterating the series of differential equations to a time t(n) at the first precision and obtaining a first precision t(n) value for the variable,
    starting with the initial value of the variable at initial time t(i), iterating the series of differential equations to time t(n) at the second, higher precision to time t(n), and obtaining a second, higher precision t(n) value for the variable,
calculating the Lyapunov exponent from the first precision t(n) value with the second, higher precision t(n) value
wherein the logic configured to calculate the Lyapunov exponent calculates the equation:

$$L(t) = \frac{1}{t} \ln \left[ \prod_{j=1}^{t} \frac{\sum_i \left|\frac{\partial f_i}{\partial X^i}\right| dX_j^i}{\sum_i \left|\frac{\partial f_i}{\partial X^i}\right| dX_{j-1}^{(i)}} \right],$$

wherein:
$f$ is a system of time-dependent differential equations describing a chaotic system,
X is an independent variable,
i and j are indexes and
t is time
and generating and displaying weather forecast maps based on the results of the calculation.

2. The method of claim 1, including calculating the number of valid digits of the first precision t(n) value and of the second, higher precision t(n) value until an error threshold is reached.

3. The method of claim 1, including calculating the number of valid digits of the first precision t(n) value and of the second, higher precision t(n) value until an error threshold is reached, wherein the error threshold is a lost digits stopping point.

4. The method of claim 1, including calculating the number of valid digits of the first precision t(n) value and of the second, higher precision t(n) value until an error threshold is reached, wherein the error threshold is a floating fractional error threshold.

5. The method of claim 1, wherein iterating the series of time-dependent differential equations continues to a time at which most of the valid digits of the first precision t(n) value of the variable and the second, higher precision t(n) value of the variable disagree.

6. The method of claim 1, further comprising selecting the first precision and the second, higher precision to match the Lyapunov exponent with experimental data.

7. The method of claim 1, wherein the differential equations describe a weather map and the Lyapunov exponent is determined.

8. The method of claim 1, wherein the differential equations describe a fluid flow system.

9. The method of claim 1, wherein the differential equations describe air flow around an airplane.

10. The method of claim 1, wherein the differential equations describe a liquid flow system and the Lyapunov exponent is determined.

11. The method of claim 1, wherein the differential equations describe traffic flow in a road network and the Lyapunov exponent is determined.

12. A non-transitory computer readable storage medium including a computer program for execution by a computer, the computer program comprising:
    a series of differential equations describing a chaotic system;
    logic configured to select a variable indicative of a condition of the chaotic system;
    logic configured to assign a first precision level to the variable;
    logic configured to assign a second precision level to the variable, the second precision level having a higher level of precision than the first precision level;
    logic configured to iterate the series of differential equations describing the chaotic system with respect to time;
    logic configured to compare a value of the variable at the first precision level with a value at the second precision level;
    logic configured to calculate the Lyapunov exponent from the comparison of values at the first and second precision levels
    wherein the logic configured to calculate the Lyapunov exponent calculates the equation:

$$L(t) = \frac{1}{t}\ln\left[\prod_{j=1}^{t}\frac{\sum_i \left|\frac{\partial f_i}{\partial X^i}\right|dX_j^i}{\sum_i \left|\frac{\partial f_i}{\partial X^i}\right|dX_{j-1}^{(i)}}\right],$$

wherein:
ƒ is a system of time-dependent differential equations describing a chaotic system,
X is an independent variable,
i and j are indexes and
t is time
and logic configured to generate and display weather forecast maps based on the results of the calculation.

13. The computer program of claim 12, wherein the logic configured to calculate the Lyapunov exponent comprises logic configured to calculate the number of valid digits until an error threshold is reached.

14. The computer program of claim 12, wherein the logic configured to calculate the Lyapunov exponent comprises logic configured to calculate the number of valid digits until an error threshold is reached, wherein the error threshold is a lost digits stopping point.

15. The computer program of claim 12, wherein the logic configured to select a variable is based on defined uncertainty factors.

16. The computer program of claim 12, wherein the logic configured to calculate the Lyapunov exponent calculates the ratios of the successive differentials of the value at the first and second, higher precision levels.

17. An apparatus for calculating the Lyapunov exponent from a series of differential equations describing a chaotic system, the apparatus comprising a processor coupled to a memory, the processor configured for implementing the steps of:

obtaining a variable indicative of a condition of the chaotic system;
assigning values of the variable to a first precision level;
assigning values of the variable to a second precision level, the second precision level having a higher level of precision than the first precision level;
iterating the series of mathematical equations describing the chaotic system with respect to time at the first precision level and the second, higher precision level;
comparing values obtained from iterating at the first precision level with the value obtained from iterating at the second, higher precision level;
calculating the Lyapunov exponent from comparing of values at the first precision level and second, higher precision level
wherein the logic configured to calculate the Lyapunov exponent calculates the equation:

$$L(t) = \frac{1}{t}\ln\left[\prod_{j=1}^{t}\frac{\sum_i \left|\frac{\partial f_i}{\partial X^i}\right|dX_j^i}{\sum_i \left|\frac{\partial f_i}{\partial X^i}\right|dX_{j-1}^{(i)}}\right],$$

wherein:
ƒ is a system of time-dependent differential equations describing a chaotic system,
X is an independent variable,
i and j are indexes and
t is time and
generating and displaying weather forecast maps based on the results of the calculation.

* * * * *